(12) United States Patent
Charbiwala et al.

(10) Patent No.: US 10,379,639 B2
(45) Date of Patent: Aug. 13, 2019

(54) SINGLE-HAND, FULL-SCREEN INTERACTION ON A MOBILE DEVICE

(71) Applicant: International Business Machines Corporation, Armonk, NY (US)

(72) Inventors: Zainul Mohammed Charbiwala, Bangalore (IN); Mohit Jain, Dhanbad (IN); Ashok Pon Kumar Sree Prakash, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 89 days.

(21) Appl. No.: 14/812,848

(22) Filed: Jul. 29, 2015

(65) Prior Publication Data
US 2017/0031463 A1  Feb. 2, 2017

(51) Int. Cl.
| G06F 3/038 | (2013.01) |
| G06F 3/041 | (2006.01) |
| G06F 3/0488 | (2013.01) |

(52) U.S. Cl.
CPC .......... *G06F 3/038* (2013.01); *G06F 3/0412* (2013.01); *G06F 3/0488* (2013.01); *G06F 2203/04101* (2013.01)

(58) Field of Classification Search
CPC ......... G02B 13/00; G06F 3/013; G06F 3/017; G06F 3/0304; G06F 3/0418; G06F 3/0425; G06F 3/04812; G06F 3/04817; G06F 3/0482; G06F 3/04842; G06F 3/0488; G06F 3/04886; G06K 9/00355
See application file for complete search history.

(56) References Cited

U.S. PATENT DOCUMENTS

| 7,667,686 | B2 | 2/2010 | Suh |
| 9,110,541 | B1* | 8/2015 | Zhou ................. G06F 3/042 |
| 2010/0214267 | A1 | 8/2010 | Radivojevic et al. |
| 2013/0147793 | A1* | 6/2013 | Jeon ................. G06F 3/011 |
| | | | 345/419 |
| 2013/0181951 | A1 | 7/2013 | Klinghult et al. |

(Continued)

FOREIGN PATENT DOCUMENTS

| CN | 102650905 A | 8/2012 |
| WO | WO2013077883 A1 | 5/2013 |

OTHER PUBLICATIONS

Chen, Xiang 'Anthony', et al., "Air+Touch: Interweaving Touch & In-Air Gestures", UIST '14, Honolulu, HI, USA, Oct. 5-8, 2014, 7 pages, ACM Digital Library.

*Primary Examiner* — Kenneth Bukowski
(74) *Attorney, Agent, or Firm* — Ference & Associates LLC

(57) ABSTRACT

Methods and arrangements for determining a pointer position for a mobile device display screen. A contemplated method includes: detecting a position of a physical object relative to the mobile device display; using the detected position to determine at least a perpendicular distance of the physical object relative to the mobile device display; calculating a position for a pointer with respect to the mobile device display, wherein the position of the pointer is determined using the perpendicular distance; and displaying the pointer on the mobile device display at the calculated position. Other variants and embodiments are broadly contemplated herein.

18 Claims, 3 Drawing Sheets

(56) References Cited

U.S. PATENT DOCUMENTS

| | | |
|---|---|---|
| 2013/0296057 A1 | 11/2013 | Gagner et al. |
| 2014/0078086 A1* | 3/2014 | Bledsoe .................. G06F 3/041 345/173 |
| 2014/0184513 A1 | 7/2014 | Huang et al. |
| 2014/0267130 A1 | 9/2014 | Hwang et al. |
| 2014/0282273 A1 | 9/2014 | Anderson |

* cited by examiner

SINGLE-HAND, FULL-SCREEN INTERACTION ON A MOBILE DEVICE

BACKGROUND

Mobile devices, such as smartphones and tablets, have been soaring in popularity in recent years. While such devices are embodied in many shapes and sizes, a developing trend has seen various items, smartphones in particular, that have grown in physical size. When a user thus wishes to interact with the screen of the mobile device, e.g., to type on a virtual keyboard or touch one or more areas of the screen to select an item, such as a visual icon for an application ("app"), it is sometimes difficult if not impossible to do so while holding the device with one hand, never mind while interacting with the device screen solely with one anatomical digit (e.g., a thumb). Thus, short of using two hands, or two anatomical digits, to interact with the device screen, operation of the device becomes difficult or even unworkable (e.g., users may end up trying to uncomfortably change the position of the device in their hand). Users may, in actuality, prefer more opportunity or capability to hold and interact with a device solely with one hand (or anatomical digit).

BRIEF SUMMARY

In summary, one aspect of the invention provides a method of determining a pointer position for display on a mobile device display, the method comprising: utilizing at least one processor to execute computer code that performs the steps of: detecting a position of a physical object relative to the mobile device display; using the detected position to determine at least a perpendicular distance of the physical object relative to the mobile device display; calculating a position for a pointer with respect to the mobile device display, wherein the position of the pointer is determined using the perpendicular distance; and displaying the pointer on the mobile device display at the calculated position.

Another aspect of the invention provides an apparatus for determining a pointer position for display on a mobile device display, the apparatus comprising: at least one processor; and a computer readable storage medium having computer readable program code embodied therewith and executable by the at least one processor, the computer readable program code comprising: computer readable program code that detects a position of a physical object relative to the mobile device display; computer readable program code that uses the detected position to determine at least a perpendicular distance of the physical object relative to the mobile device display; computer readable program code that calculates a position for a pointer with respect to the mobile device display, wherein the position of the pointer is determined using the perpendicular distance; and computer readable program code that displays the pointer on the mobile device display at the calculated position.

An additional aspect of the invention provides a computer program product for determining a pointer position for display on a mobile device display, the computer program product comprising: a computer readable storage medium having computer readable program code embodied therewith, the computer readable program code comprising: computer readable program code that detects a position of a physical object relative to the mobile device display; computer readable program code that uses the detected position to determine at least a perpendicular distance of the physical object relative to the mobile device display; computer readable program code that calculates a position for a pointer with respect to the mobile device display, wherein the position of the pointer is determined using the perpendicular distance; and computer readable program code that displays the pointer on the mobile device display at the calculated position.

A further aspect of the invention provides a method comprising: detecting a position of a human thumb relative to a mobile device display screen; using the detected position to determine at least a perpendicular distance of a portion of the human thumb relative to the mobile device display screen; calculating a position for a pointer with respect to the mobile device display screen, via transforming the perpendicular distance to a position for the pointer; wherein the transforming comprises determining a distal end of a simulated shadow of the human thumb upon the mobile device display screen, given a simulated incident light angle; and displaying the pointer on the mobile device display screen at the calculated position.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Figure 1:
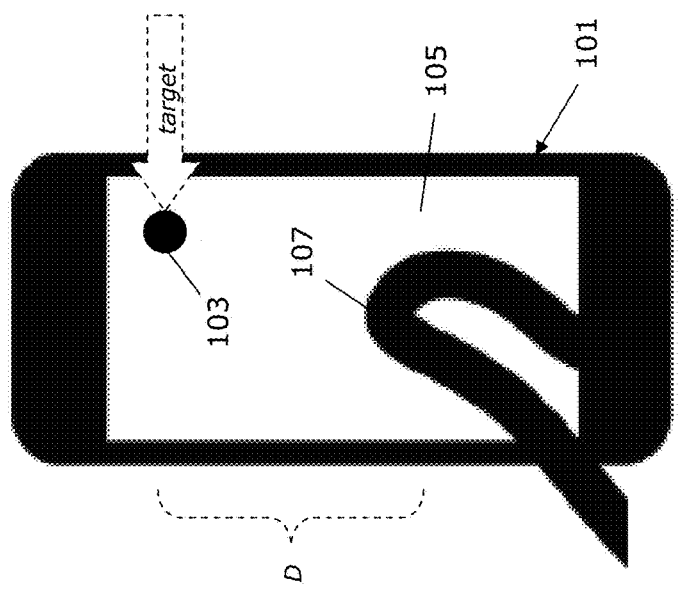
FIG. 1 schematically illustrates a pattern of interaction with a mobile phone.

Specific reference will now be made here below to FIGS. 1 and 2. It should be appreciated that the processes, arrangements and products broadly illustrated therein can be carried out on, or in accordance with, essentially any suitable computer system (including smartphones, tablets, etc.) or set of computer systems, which may, by way of an illustrative and non-restrictive example, include a system or server such as that indicated at 12' in FIG. 3. In accordance with an exemplary embodiment, most if not all of the process steps, components and outputs discussed with respect to FIGS. 1 and 2 can be performed or utilized by way of a processing unit or units and system memory such as those indicated, respectively, at 16' and 28' in FIG. 3, whether on a server computer, a client computer, a node computer in a distributed network, or any combination thereof.

Broadly contemplated herein, in accordance with at least one embodiment of the invention, are methods and arrangements which permit effortless single-handed full screen area interaction with a handheld mobile device of any of a great variety of physical sizes, via scaling the position of a pointer in general proportion to the height of a user's finger above the display screen, thereby combining surface interaction and in-air interaction seamlessly. This can be undertaken without any modification to the display area and/or to the area where visual icons (e.g., icons relating to applications and other functions) may reside. In at least one variant embodiment, the features discussed herebelow may also be implemented in a context of using two thumbs or digits which interact with a screen area, each serving to actuate on the screen in a manner discussed herebelow in connection with one thumb or digit.

The features discussed above, and others, relating to at least one embodiment of the invention, will be better appreciated from the discussion which follows.

In accordance with a general background relative to at least one embodiment of the invention, and as noted heretofore, mobile devices such as smartphones have generally been getting larger in physical size; small tablet computers such as "phablets" have also been appearing. In all these cases, a user may well prefer to interact with the display screen solely with one hand and/or one anatomical digit, but comparatively larger screen sizes (e.g., greater than 5.2 inches in length, or even 6 inches or more) make this difficult. As such, FIG. 1 schematically illustrates a pattern of interaction with a mobile device 101. Here, it can be seen that while a user may wish to activate a target (103) on the display screen of the phone, a significant working distance D between his/her thumb 107 of one hand and the target 103 may well present as prohibitive.

As such, in accordance with a general background relative to at least one embodiment of the invention, conventional solutions have proven to be unproductive or inefficient. For instance, the size of the area where active visual icons reside could be shrunken in order to make the icons more accessible to be reached by a single thumb. However, it can be appreciated that such a shrinking in the size of this area serves to end up underutilizing the potential of a larger screen, thus defeating the purpose of providing such a screen to begin with. Generally, conventional solutions may be unworkable for many users, or may even go so far as involving the learning of needlessly complex gestures (or combinations thereof).

In accordance with at least one embodiment of the invention, there are broadly contemplated herein methods and arrangements which scale the position of a pointer in general proportion to the height of a user's finger (e.g., thumb) above the display screen. To this end, the pointer could be represented by a floating dot or other smaller icon on the screen which, when positioned at an area corresponding to another visual icon such as one representing an application or a place on a virtual keyboard, is in a position to activate that other visual icon.

Figure 2:
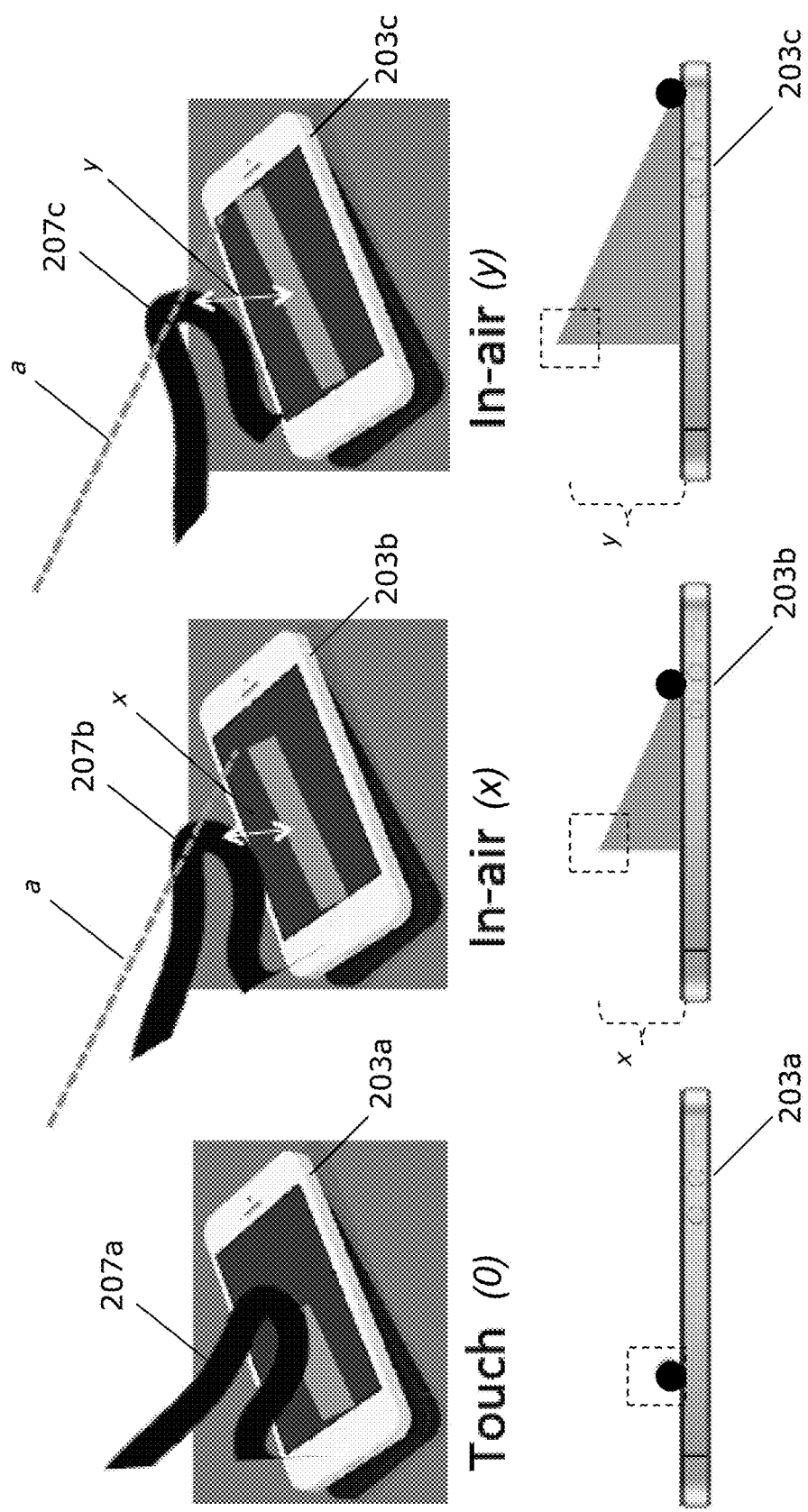
FIG. 2 provides a series of perspective views and elevational views of a mobile phone.

In accordance with at least one embodiment of the invention, FIG. 2 provides a series of successive perspective views (upper row) and elevational views (lower row) of a mobile phone (203a/b/c) which incorporates features as just discussed. Generally, the position of a user's thumb 207a/b/c will be detected relative to the display screen of the phone (darker shaded area in perspective views of phone 203a/b/c). Such detection can include a perpendicular distance of at least a portion of the thumb 207a/b/c with respect to the display screen, or a general angle thereof with respect to the display screen (e.g., 30 degrees, 45 degrees, etc.). Generally, such detection may be defined with respect to a "zero" point on the display screen that defines a three-dimensional coordinate system; the pointer position itself may also be defined relative to the same coordinate system in terms of two of the three dimensions. Upon such detection being made, a pointer position is established which corresponds to the distal end of a simulated shadow of the user's thumb on the display screen, given a simulated incident light angle a.

Accordingly, in accordance with at least one embodiment of the invention, progressing left to right in the upper portion of FIG. 2, there are shown three different representations (perspective views) of such a simulated shadow (rectangles with lighter shading) with respect to the display screen, given direct touch (a perpendicular distance of 0 between the screen and a contact surface of the user's thumb [207a]), a perpendicular distance of x between the screen and a contact surface of the user's thumb (207b), and a perpendicular distance of y (where y>x) between the screen and a contact surface of the user's thumb (207c). It should be understood that the simulated shadow is shown for illustrative purposes only and does not necessarily need to appear as depicted on the display screen.

In accordance with at least one embodiment of the invention, progressing left to right in the lower portion of FIG. 2, there are shown three different representations from an elevational viewpoint, corresponding to the three perspective views just described. Here, the position of a user's thumb tip is indicated by a dotted square (again, at perpendicular distances of 0, x and y [>x] with respect to the display screen), while the effective position of a pointer on the display screen of phone 203a/b/c is shown via a darkened circle. The perceptual position of a simulated shadow (again, not necessarily visually implemented in practice but shown here for illustrative purposes) is shown via shaded triangles in the center and right views in the lower portion of FIG. 2.

In accordance with at least one embodiment of the invention, any of a very wide variety of components may be implemented in order to detect the position of a user's thumb (or other anatomical digit) with respect to a display screen and thereby calculate and manifest the position of a pointer (on the display screen) that would correspond to the extent of a simulated shadow as just described. Merely by way of illustrative and non-restrictive example, a module or utility incorporated into a phone could detect finger movement in the air at any point between the screen and a certain perpendicular distance from the screen; one example of such technology is the 3D Touch™ finger hover technology developed by Synaptics of San Jose, Calif. Also usable is a vertically placed component that can help with additional accuracy in ascertaining fingertip height or position relative to a screen; just by way of example, a depth camera may be used in such a scenario such as Leap Motion, Inc., of San Francisco, Calif. By way of illustrative example, such a camera could be protrude out of the phone to some degree, and/or could be cleanly integrated (or "flush") with the general dimensions of the phone.

In accordance with at least one embodiment of the invention, an onboard module or utility of the mobile device may be employed to collect data from components such as those just described, and thereby effectively determine the position of a user's thumb tip as generally depicted in FIG. 2. Further an onboard module or utility of the mobile device may be employed to translate this position into establishing a position of a pointer on the mobile device display screen, in a manner as generally discussed heretofore.

In accordance with at least one embodiment of the invention, to the extent that the position of a pointer is established on a mobile device display screen, a "tap" action can then be undertaken or simulated in order to activate a visual icon or other item on which the pointer is visually superimposed. The tap action can be detected, by the detection components discussed above, upon movement of distal and proximal phalange bones of the user's thumb, or an alternative "trigger" for tap action can be detected, which could involve: an actual tap (via another one of the user's fingers) on the back of the phone; an auditory cue of the user; holding the thumb or finger for a certain duration of time; or any of a great variety of other suitable methods.

In view of the foregoing, it can be appreciated that various advantages may be enjoyed in accordance with at least one embodiment of the invention. Among there are a broadened capability for one-handed interaction with any mobile device, thereby making an entire display screen area effectively navigable. Other advantages include a minimal learning curve for a user, a smoothly integrated combination of in-surface (touch) and in-air interaction and minimal addition of hardware, if indeed such is needed at all. It can also be appreciated that solutions as broadly contemplated herein can assume a very low cost relative to the broadened capabilities that are enabled.

Reference is made hereabove to anatomical digits such as fingers or thumbs which interact with a mobile device. In a broad sense, these may be considered "physical objects" which help determine the ultimate position of a pointer with respect to a mobile device display (or display screen); typically, such a surface will be coincident with at least a portion of a mobile device display input surface, which itself may be actuated in one region or another thereof (e.g., via an on-screen keyboard or one or more regions where an icon of an "app" [application] can be actuated) to provide prompts or commands to the mobile device. In accordance with at least one variant embodiment of the invention, non-anatomical physical objects may also be considered here for a similar purpose, such as a stick or stylus that may be held or manipulated by a user.

It can be appreciated from the foregoing that, in accordance with at least one embodiment of invention, a technical improvement is represented at least via provision of methods and arrangements which permit effortless single-handed full screen area interaction with a handheld mobile device of any of a great variety of physical sizes, via scaling the position of a pointer in general proportion to the height of a user's finger above the display screen, thereby combining surface interaction and in-air interaction seamlessly.

It should be understood that essentially any suitable computing device may be employed in accordance with at least one embodiment of the invention. As such, mobile devices, including smart phones or other devices such as tablet computers, may easily incorporate arrangements such as those described and illustrated hereabove with respect to FIGS. 1 and 2. Merely by way of illustrative example, a computing node is discussed here below which may be employed in accordance with any suitable aspect of at least one embodiment of the invention. Further, a mobile device, as may be employed in accordance with at least one embodiment of the invention as broadly contemplated herein, could include components which function analogously to any and all of those discussed herebelow in connection with FIG. 3.

Figure 3:
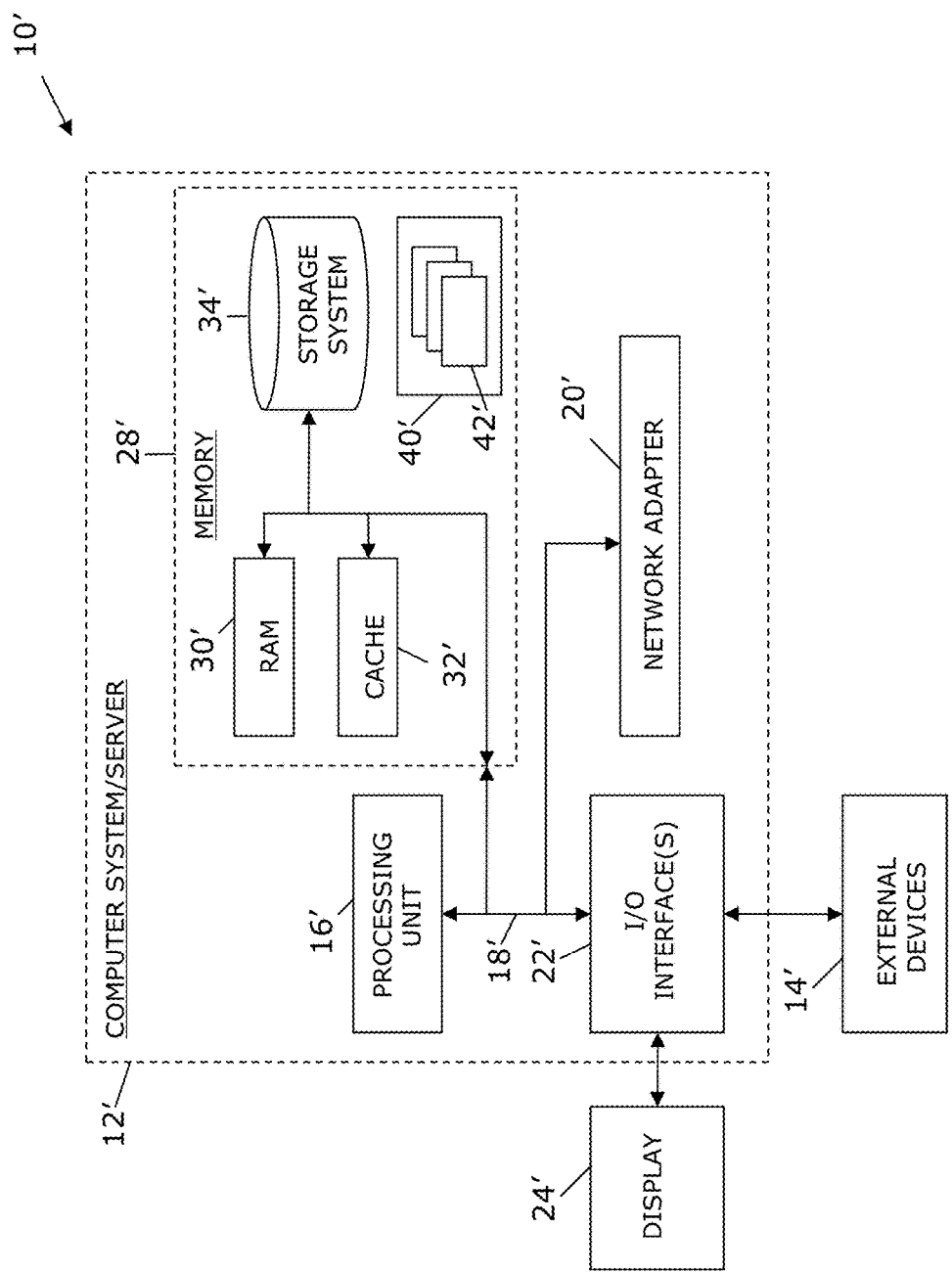
FIG. 3 illustrates a computer/tablet/smartphone system.

Referring now to FIG. 3, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining a pointer position for display on a mobile device display, said method comprising:
   utilizing at least one processor to execute computer code that performs the steps of:
   displaying a target object comprising a visual icon on a mobile device display, wherein the target object is displayed at a location on the mobile device display away from a physical object used to select the target object;
   detecting, using a depth camera, a position of the physical object relative to the mobile device display, wherein the detecting a position comprises detecting a position of the physical object in a three-dimensional space above the mobile device display with respect to a zero point on the mobile device display that defines a three-dimensional coordinate system;
   using the detected position to determine at least a perpendicular distance of the physical object from the mobile device display;
   generating and displaying on the mobile device display, a simulated shadow, wherein the simulated shadow begins at the zero point on the mobile device display and extends across the mobile device display based upon the perpendicular distance of the physical object from the mobile device display, wherein the length of the simulated shadow decreases as the perpendicular distance decreases and the length of the simulated shadow increases as the perpendicular distance increases;
   calculating a position for a visual pointer corresponding to a location of selection by the physical object to be displayed on the mobile device display, wherein the position of the pointer is determined using the perpendicular distance and is located at a distal end of the simulated shadow and wherein the position of the pointer is defined with respect to two of the three dimensions of the three-dimensional coordinate system and wherein the calculating a position for a pointer comprises scaling the position of the pointer proportional to the perpendicular distance and wherein the position for a pointer is calculated and displayed as being further from the zero point and as being closer to the displayed target object as the perpendicular distance increases; and
   displaying the pointer on the mobile device display at the calculated position, the visual pointer being a visual indicator distinct and separate from the simulated shadow.

2. The method according to claim 1, wherein said calculating comprises determining a distal end of a simulated shadow of the physical object upon the mobile device display screen, given a simulated incident light angle.

3. The method according to claim 1, wherein the physical object comprises a human anatomical digit.

4. The method according to claim 3, wherein the human anatomical digit comprises a human thumb.

5. The method according to claim 1, wherein the visual pointer is movable to all portions of the mobile device display.

6. The method according to claim 1, comprising selecting the target object by determining a tap action when the visual pointer is in a static position, wherein the tap action is performed at the position of the physical object above the mobile device display.

7. The method according to claim 6, wherein said determining of a tap action comprises discerning an auditory cue.

8. The method according to claim 1, comprising selecting the target object by detecting a tap, on the back of the mobile device, when the pointer is in a static position.

9. The method according to claim 1, wherein the mobile device display comprises at least a portion of a mobile device input surface.

10. An apparatus for determining a pointer position for display on a mobile device display, said apparatus comprising:
   at least one processor; and
   a computer readable storage medium having computer readable program code embodied therewith and executable by the at least one processor, the computer readable program code comprising:
   computer readable program code that displays a target object comprising a visual icon on a mobile device display, wherein the target object is displayed at a location on the mobile device display away from a physical object used to select the target object;
   computer readable program code that detects, using a depth camera, a position of the physical object relative to the mobile device display, wherein the detecting a position comprises detecting a position of the physical object in a three-dimensional space above the mobile device display with respect to a zero point on the mobile device display that defines a three-dimensional coordinate system;
   computer readable program code that uses the detected position to determine at least a perpendicular distance of the physical object from the mobile device display;
   computer readable program code that generates and displays on the mobile device display, a simulated shadow, wherein the simulated shadow begins at the zero point on the mobile device display and extends across the mobile device display based upon the perpendicular distance of the physical object from the mobile device display, wherein the length of the simulated shadow decreases as the perpendicular distance decreases and the length of the simulated shadow increases as the perpendicular distance increases;
   computer readable program code that calculates a position for a visual pointer corresponding to a location of selection by the physical object to be displayed on the mobile device display, wherein the position of the pointer is determined using the perpendicular distance and is located at a distal end of a simulated shadow and wherein the position of the pointer is defined with respect to two of the three dimensions of the three-dimensional coordinate system and wherein the calculating a position for a pointer comprises scaling the position of the pointer proportional to the perpendicular distance and wherein the position for a pointer is calculated and displayed as being further from the zero point and as being closer to the displayed target object as the perpendicular distance increases; and
   computer readable program code that displays the visual pointer on the mobile device display at the calculated position, the visual pointer being a visual indicator distinct and separate from the simulated shadow.

11. A computer program product for determining a pointer position for display on a mobile device display, said computer program product comprising:
   a computer readable storage medium having computer readable program code embodied therewith, the computer readable program code comprising:
   computer readable program code that displays a target object comprising a visual icon on a mobile device display, wherein the target object is displayed at a location on the mobile device display away from a physical object used to select the target object;
   computer readable program code that detects, using a depth camera, a position of the physical object relative to the mobile device display, wherein the detecting a position comprises detecting a position of the physical object in a three-dimensional space above the mobile device display with respect to a zero point on the mobile device display that defines a three-dimensional coordinate system;
   computer readable program code that uses the detected position to determine at least a perpendicular distance of the physical object from the mobile device display;
   computer readable program code that generates and displays on the mobile device display, a simulated shadow, wherein the simulated shadow begins at the zero point on the mobile device display and extends across the mobile device display based upon the perpendicular distance of the physical object from the mobile device display, wherein the length of the simulated shadow decreases as the perpendicular distance decreases and the length of the simulated shadow increases as the perpendicular distance increases;
   computer readable program code that calculates a position for a visual pointer corresponding to a location of selection by the physical object to be displayed on the mobile device display, wherein the position of the pointer is determined using the perpendicular distance and is located at a distal end of a simulated shadow and wherein the position of the pointer is defined with respect to two of the three dimensions of the three-dimensional coordinate system and wherein the calculating a position for a pointer comprises scaling the position of the pointer proportional to the perpendicular distance and wherein the position for a pointer is calculated and displayed as being further from the zero point and as being closer to the displayed target object as the perpendicular distance increases; and
   computer readable program code that displays the visual pointer on the mobile device display at the calculated position, the visual pointer being a visual indicator distinct and separate from the simulated shadow.

12. The computer program product according to claim 11, wherein the calculating comprises determining a distal end of a simulated shadow of the physical object upon the mobile device display screen, given a simulated incident light angle.

13. The computer program product according to claim 12, wherein the physical object comprises a human anatomical digit.

14. The computer program product according to claim 13, wherein the human anatomical digit comprises a human thumb.

15. The computer program product according to claim 11, wherein the visual pointer is movable to all portions of the mobile device display.

16. The computer program product according to claim 11, comprising computer readable program code configured to select the target object by determining a tap action when the visual pointer is in a static position, wherein the tap action is performed at the position of the physical object above the mobile device display.

17. The computer program product according to claim 11, comprising computer readable program code configured to select the target object by detecting a tap, on the back of the mobile device, when the pointer is in a static position.

18. A method comprising:
  displaying a target object comprising a visual icon on a mobile device display, wherein the target object is displayed at a location on the mobile device display away from a human thumb used to select the target object;
  detecting, using a depth camera, a position of the human thumb relative to a mobile device display screen, wherein the detecting a position comprises detecting a position of the human thumb in a three-dimensional space above the mobile device display with respect to a zero point on the mobile device display that defines a three-dimensional coordinate system;
  using the detected position to determine at least a perpendicular distance of a portion of the human thumb relative to the mobile device display screen;
  generating and displaying on the mobile device display, a simulated shadow, wherein the simulated shadow begins at the zero point on the mobile device display and extends across the mobile device display based upon the perpendicular distance of the human thumb from the mobile device display, wherein the length of the simulated shadow decreases as the perpendicular distance decreases and the length of the simulated shadow increases as the perpendicular distance increases;
  calculating a position for a visual pointer corresponding to a location of selection by the human thumb to be displayed on the mobile device display screen, via transforming the perpendicular distance to a position for the pointer and wherein the position of the pointer is defined with respect to two of the three dimensions of the three-dimensional coordinate system, wherein the calculating a position for a pointer comprises scaling the position of the pointer proportional to the perpendicular distance;
  wherein said transforming comprises determining a distal end of the simulated shadow, given a simulated incident light angle and wherein the position for a pointer is calculated and displayed as being further from the position of the zero point and as being closer to the displayed target object as the perpendicular distance increases; and
  displaying the visual pointer on the mobile device display screen at the calculated position, the visual pointer being a visual indicator distinct and separate from the simulated shadow.

* * * * *